United States Patent
Jung et al.

(10) Patent No.: US 10,973,365 B2
(45) Date of Patent: Apr. 13, 2021

(54) BEVERAGE EXTRACTING DEVICE AND WATER PURIFIER INCLUDING SAME

(71) Applicant: COWAY CO., LTD., Chungcheongnam-do (KR)

(72) Inventors: Hee-Do Jung, Seoul (KR); Young-Hoon Hong, Seoul (KR); Min-Sub Song, Seoul (KR); Jin-Woo Choi, Seoul (KR)

(73) Assignee: Coway Co., Ltd

( * ) Notice: Subject to any disclaimer, the term of this patent is extended or adjusted under 35 U.S.C. 154(b) by 866 days.

(21) Appl. No.: 15/510,481

(22) PCT Filed: Aug. 28, 2015

(86) PCT No.: PCT/KR2015/009076
§ 371 (c)(1),
(2) Date: Mar. 10, 2017

(87) PCT Pub. No.: WO2016/039543
PCT Pub. Date: Mar. 17, 2016

(65) Prior Publication Data
US 2017/0280921 A1   Oct. 5, 2017

(30) Foreign Application Priority Data
Sep. 12, 2014 (KR) ........................ 10-2014-0121398

(51) Int. Cl.
*A47J 31/40* (2006.01)
*B01D 35/00* (2006.01)
(Continued)

(52) U.S. Cl.
CPC ............. *A47J 31/407* (2013.01); *A47J 31/36* (2013.01); *A47J 31/3633* (2013.01);
(Continued)

(58) Field of Classification Search
CPC .. A47J 31/407; A47J 31/3638; A47J 31/3633; A47J 31/3666; A47J 31/3695;
(Continued)

(56) References Cited

U.S. PATENT DOCUMENTS

2005/0160919 A1* 7/2005 Balkau ................ A47J 31/0673
99/279
2012/0031281 A1* 2/2012 Denisart ............. A47J 31/3676
99/295
(Continued)

FOREIGN PATENT DOCUMENTS

CN 101485542 7/2009
CN 201743493 2/2011
(Continued)

OTHER PUBLICATIONS

European Search Report dated Aug. 14, 2017 issued in counterpart application No. 15840407.9-1656, 6 pages.
(Continued)

*Primary Examiner* — Phuong T Nguyen
(74) *Attorney, Agent, or Firm* — The Farrell Law Firm, P.C.

(57) ABSTRACT

A beverage extracting device is provided that includes an extracting part including an installing space in which a beverage capsule is installed; an opening and closing part connected to the extracting part, for opening or sealing the installing space; a link part connected to at least one from among the extracting part and the opening and closing part; and a perforating part for moving reciprocally according to the movement of the link part so as to perforate the beverage capsule.

20 Claims, 11 Drawing Sheets

(51) Int. Cl.
*A47J 31/36* (2006.01)
*A47J 31/44* (2006.01)
*C02F 1/00* (2006.01)

(52) U.S. Cl.
CPC .......... *A47J 31/4475* (2013.01); *B01D 35/00* (2013.01); *C02F 1/00* (2013.01); *C02F 2307/10* (2013.01)

(58) Field of Classification Search
CPC .......... A47J 31/40; A47J 31/60; A47J 31/542; A47J 31/3676; A47J 31/36; A47J 31/54; A47J 31/00; A47J 31/446; A47J 31/369
USPC .......................... 99/279, 287, 289, 295, 300
See application file for complete search history.

(56) References Cited

U.S. PATENT DOCUMENTS

| | | |
|---|---|---|
| 2014/0130679 A1 | 5/2014 | Baldo et al. |
| 2014/0130680 A1 | 5/2014 | Fin et al. |
| 2015/0059589 A1* | 3/2015 | Xue .................... A47J 31/407 99/295 |
| 2015/0150407 A1 | 6/2015 | Bugnano et al. |

FOREIGN PATENT DOCUMENTS

| | | |
|---|---|---|
| CN | 103657224 | 3/2014 |
| CN | 203609280 | 5/2014 |
| EP | 2 000 063 | 12/2008 |
| EP | 2 543 290 | 1/2013 |
| EP | 2 543 291 | 1/2013 |
| EP | 2918198 | 9/2015 |
| KR | 1020060042865 | 5/2006 |
| KR | 1020090035738 | 4/2009 |
| KR | 1020090079832 | 7/2009 |
| KR | 1020140060410 | 5/2014 |
| WO | WO 2013/042011 | 3/2013 |
| WO | WO 2013/182923 | 12/2013 |
| WO | WO 2014073822 | 5/2014 |

OTHER PUBLICATIONS

Chinese Office Action dated Oct. 9, 2018 issued in counterpart application No. 201580048940.0, 10 pages.
Third Party Observation dated Sep. 16, 2020 issued in counterpart application No. 15840407.9-1004, 9 pages.
European Search Report dated Sep. 25, 2020 issued in counterpart application No. 15840407.9-1004, 6 pages.

* cited by examiner

[Figure 1]
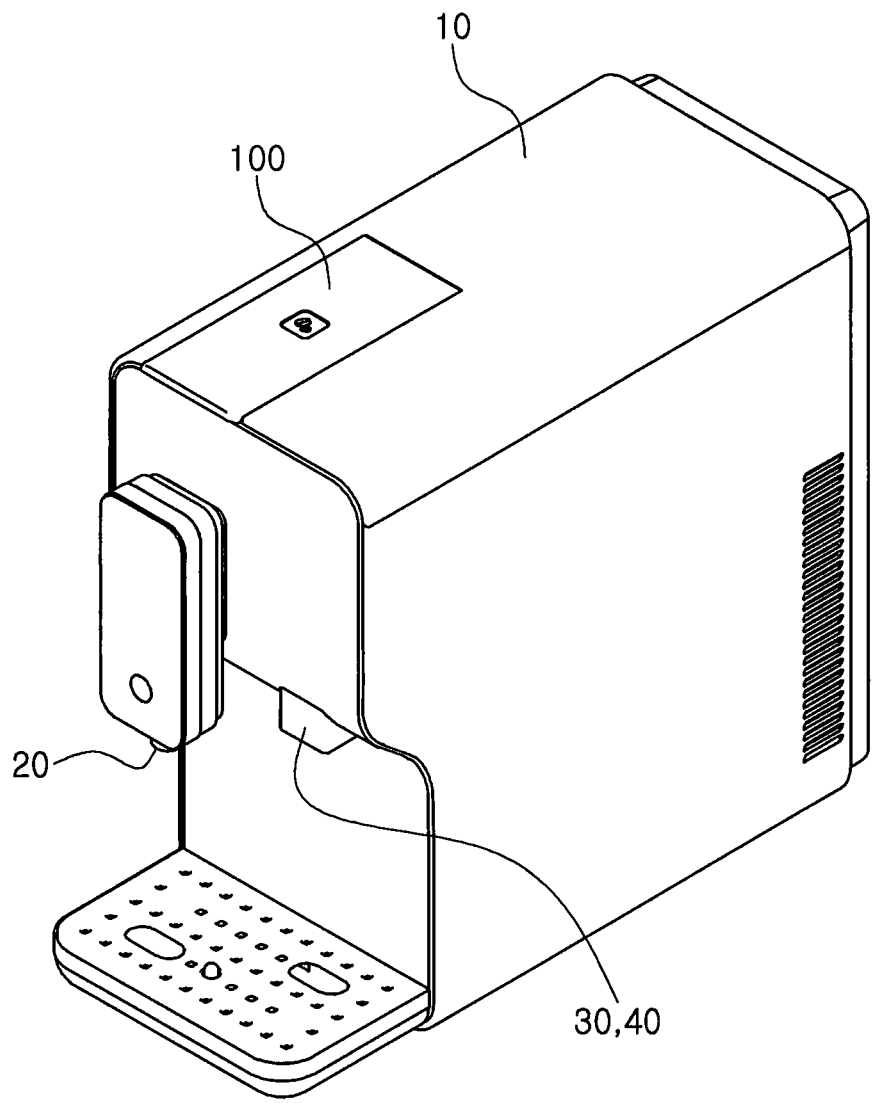

[Figure 2]
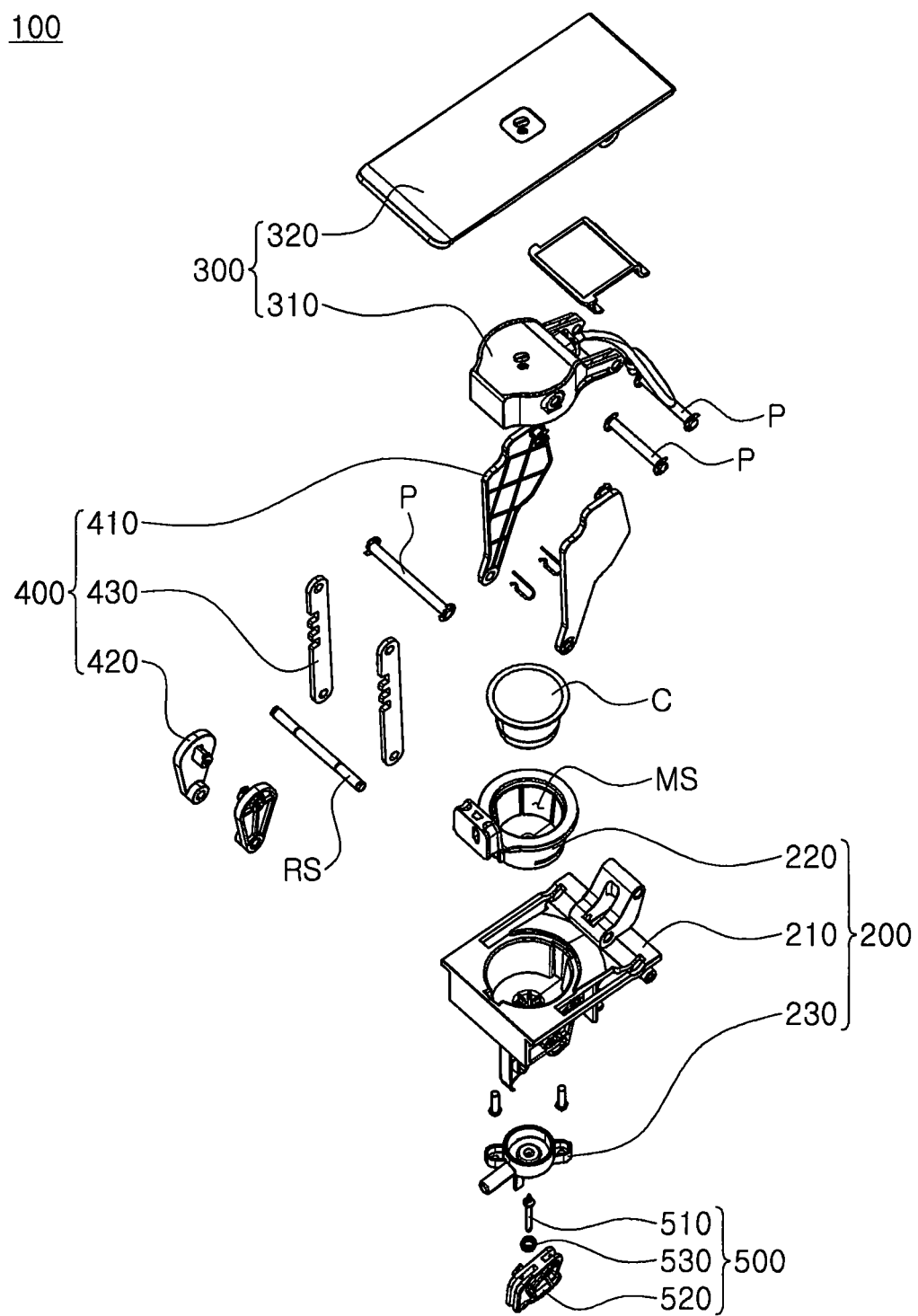

[Figure 3]
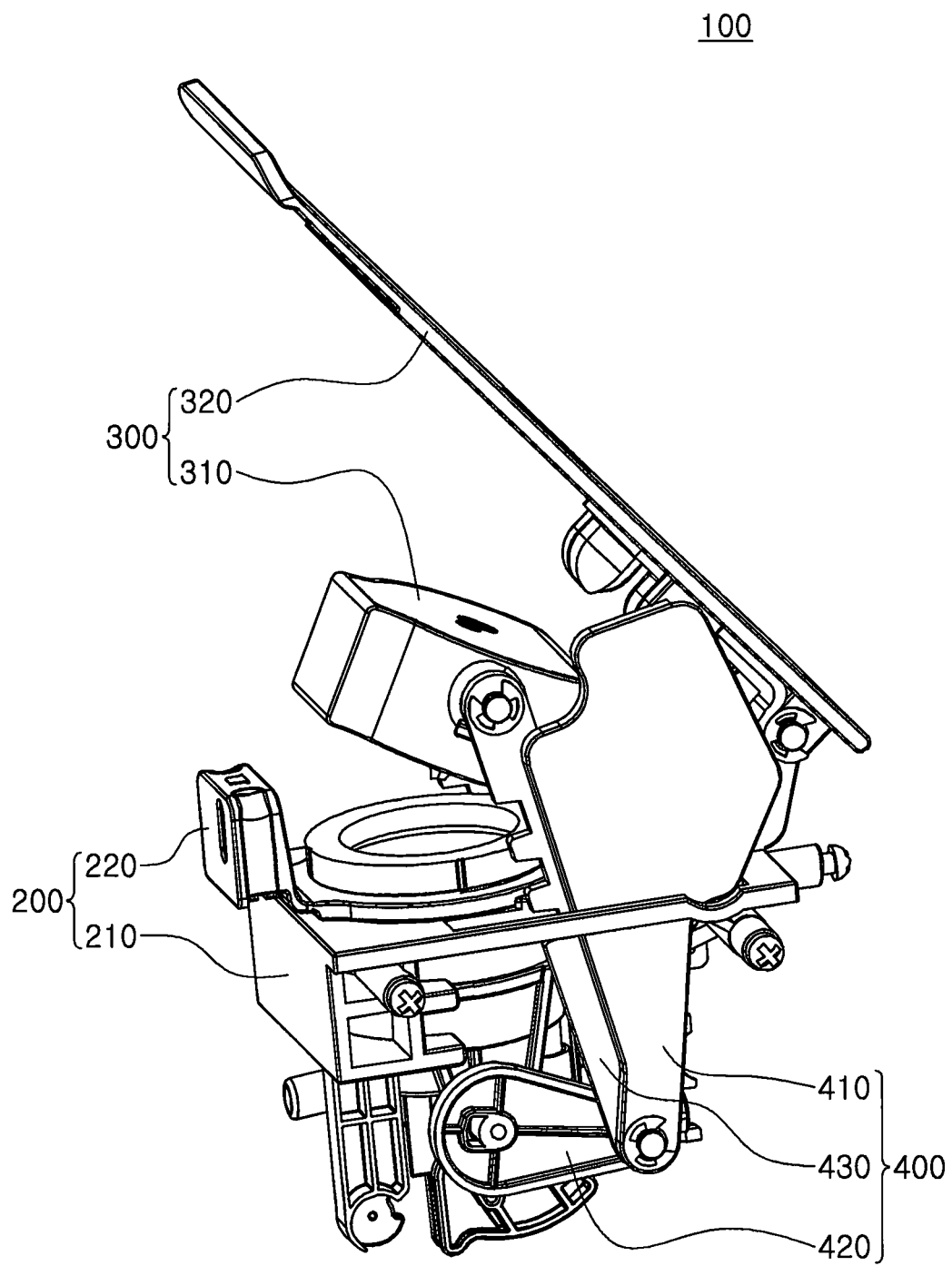

[Figure 4]
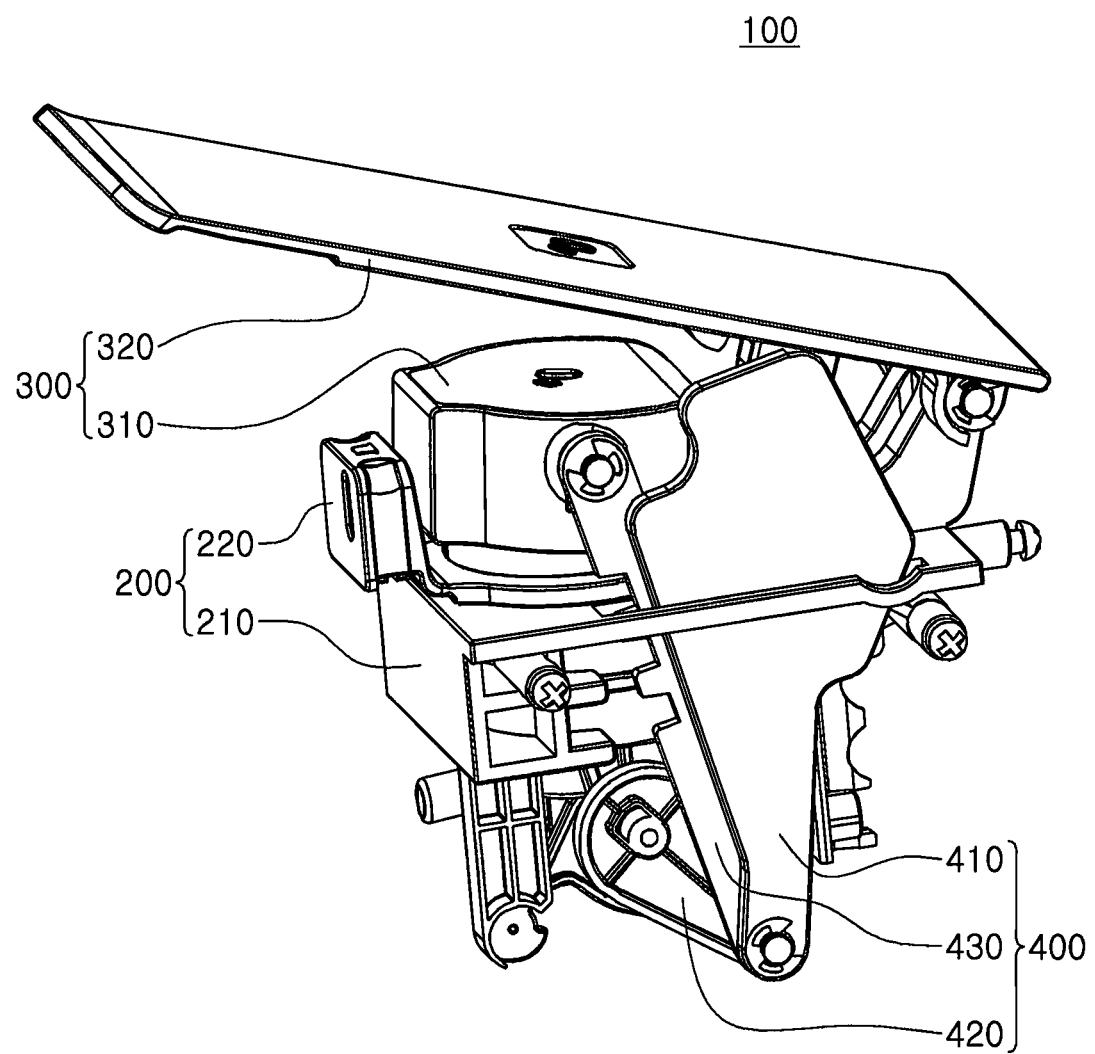

[Figure 5]
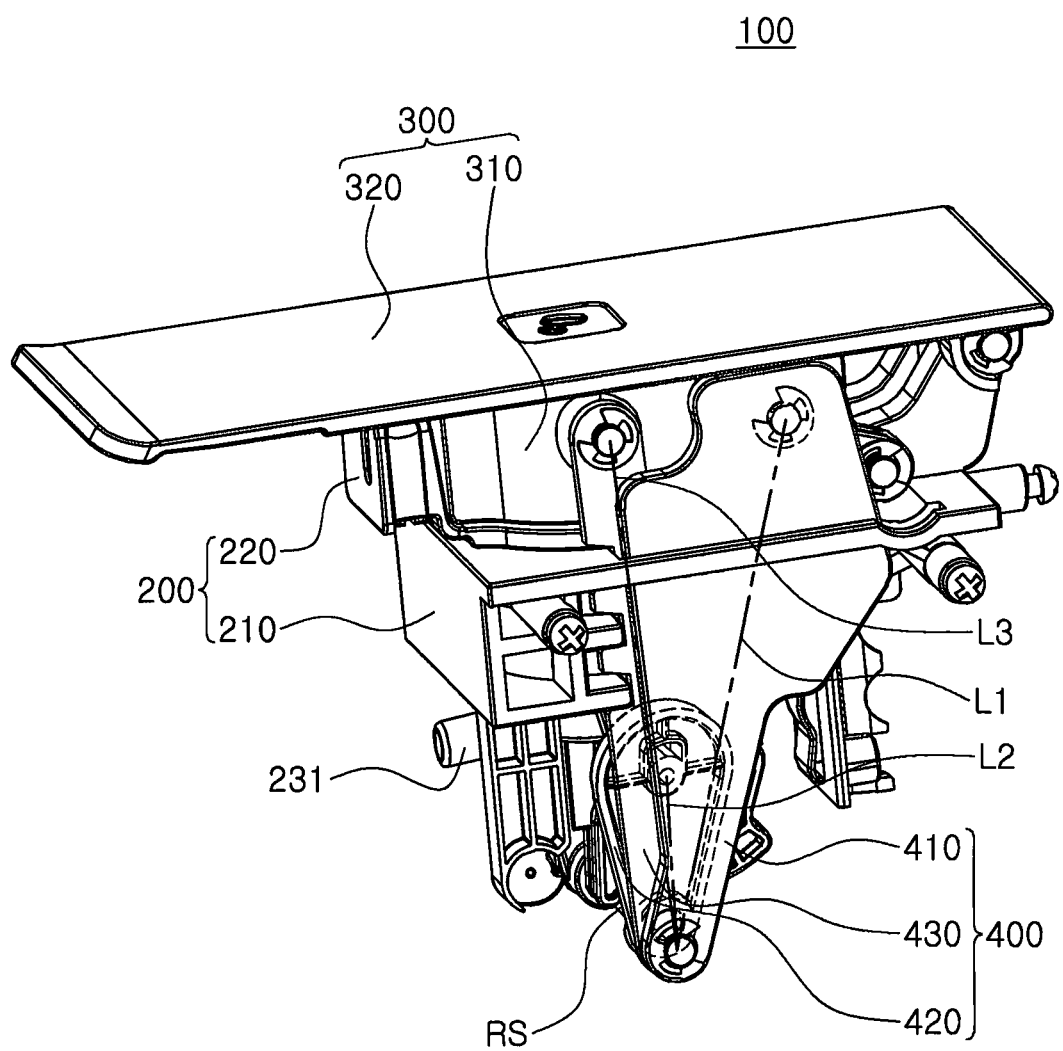

[Figure 6]
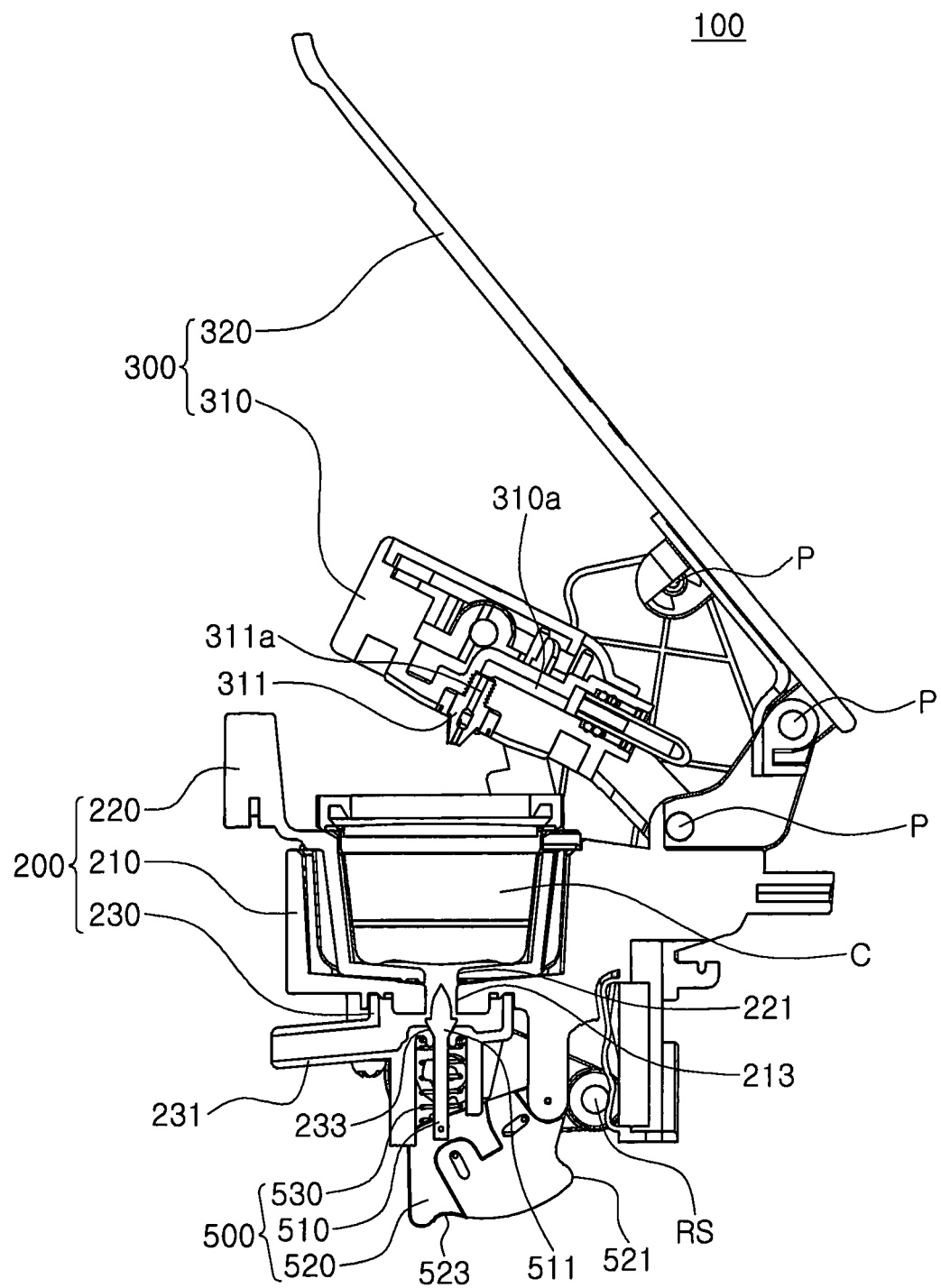

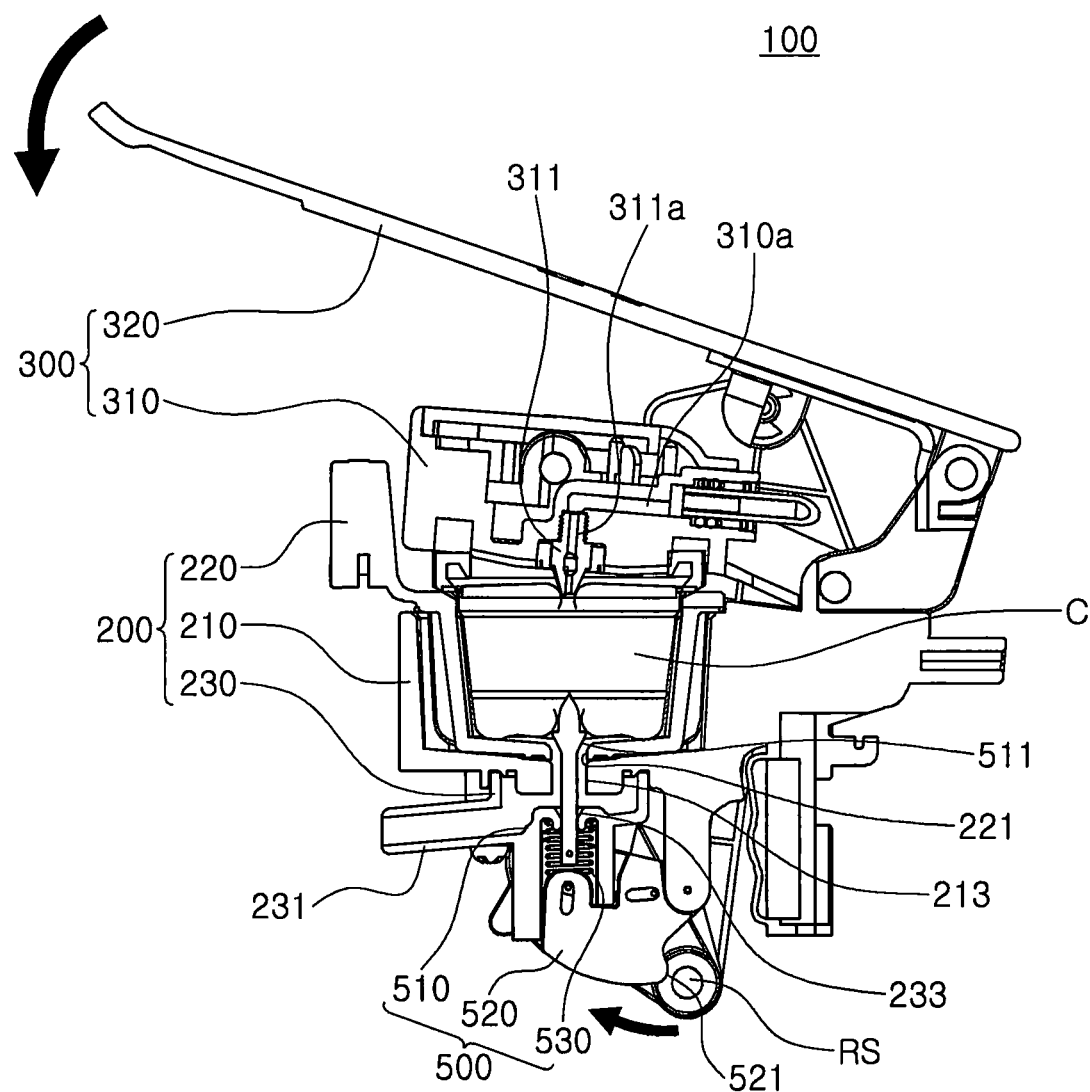
[Figure 7]

[Figure 8]
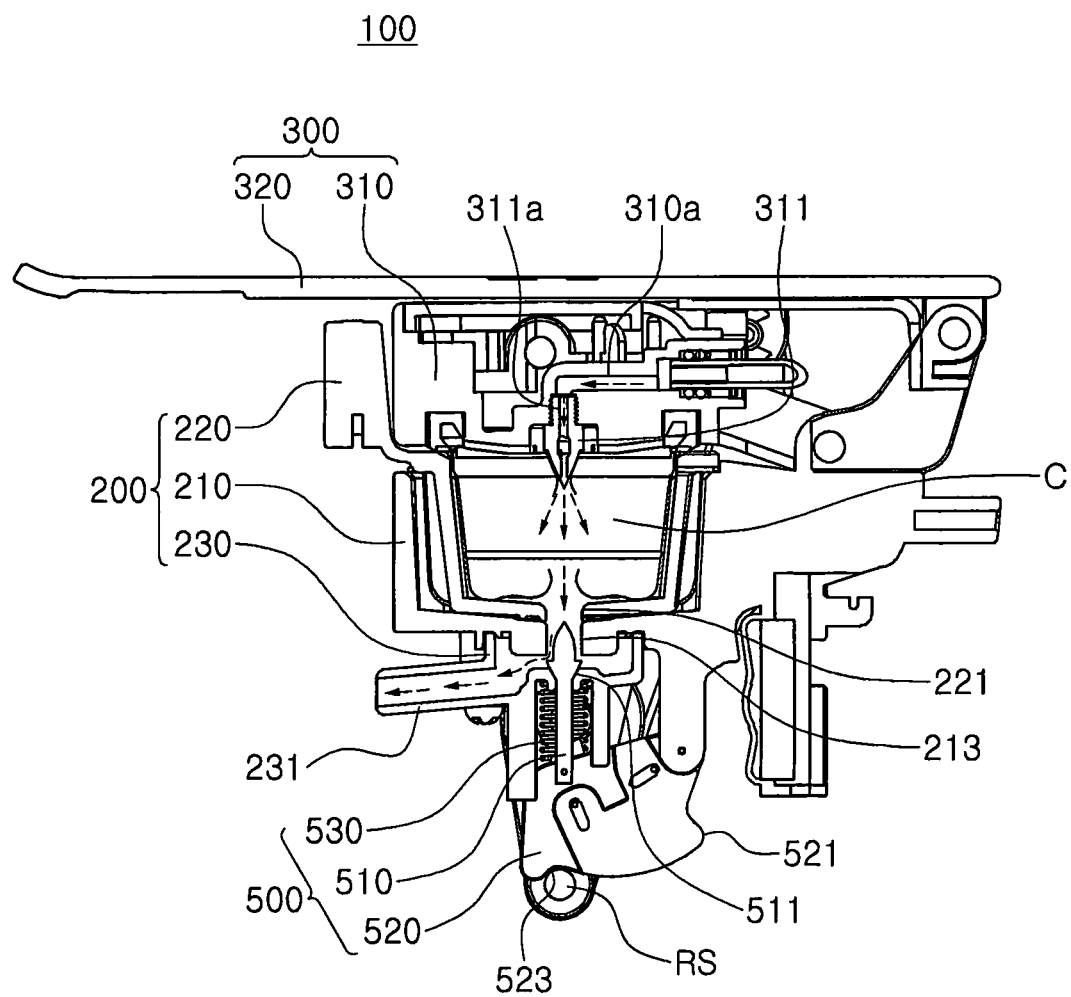

[Figure 9]
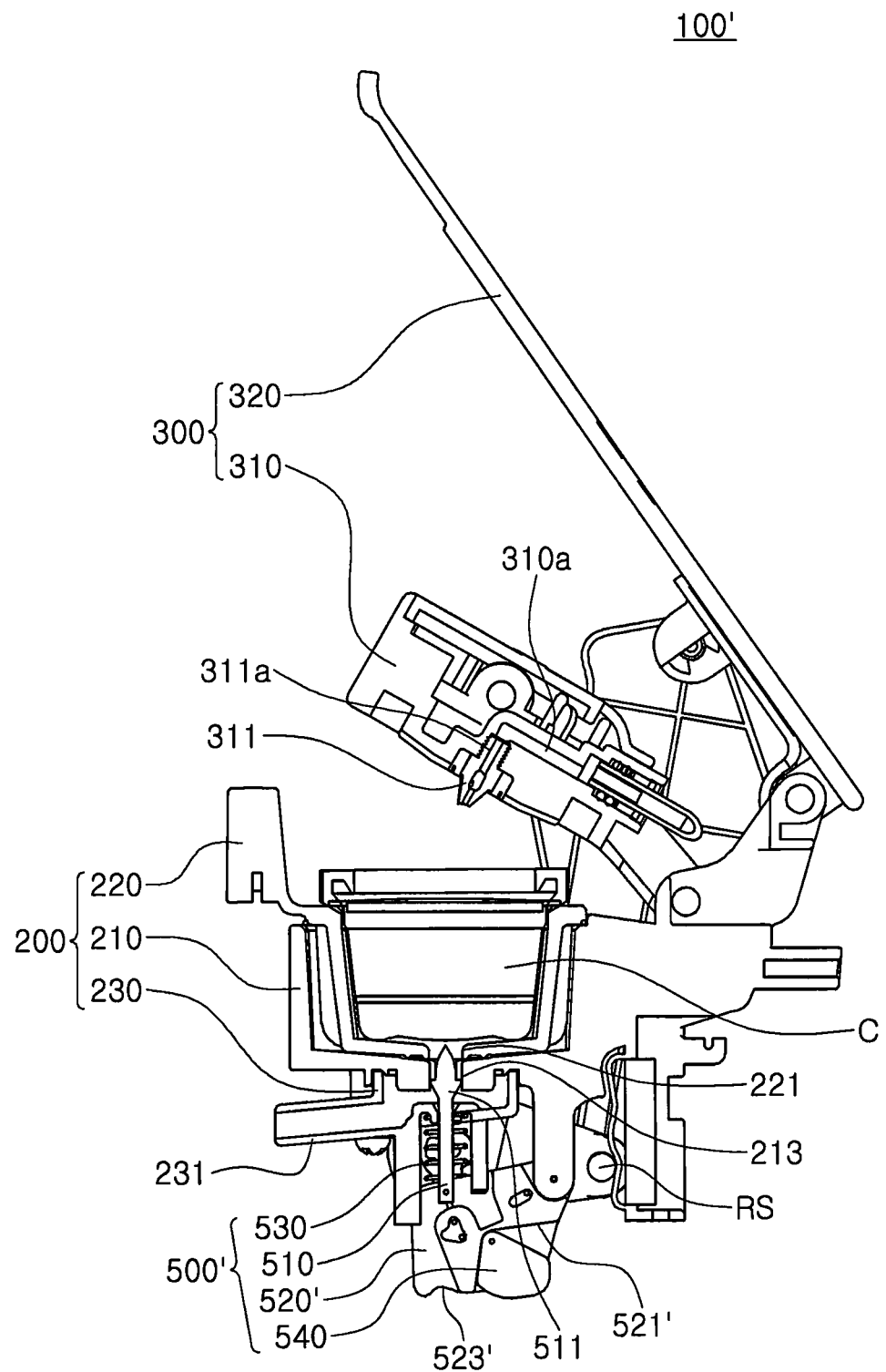

[Figure 10]
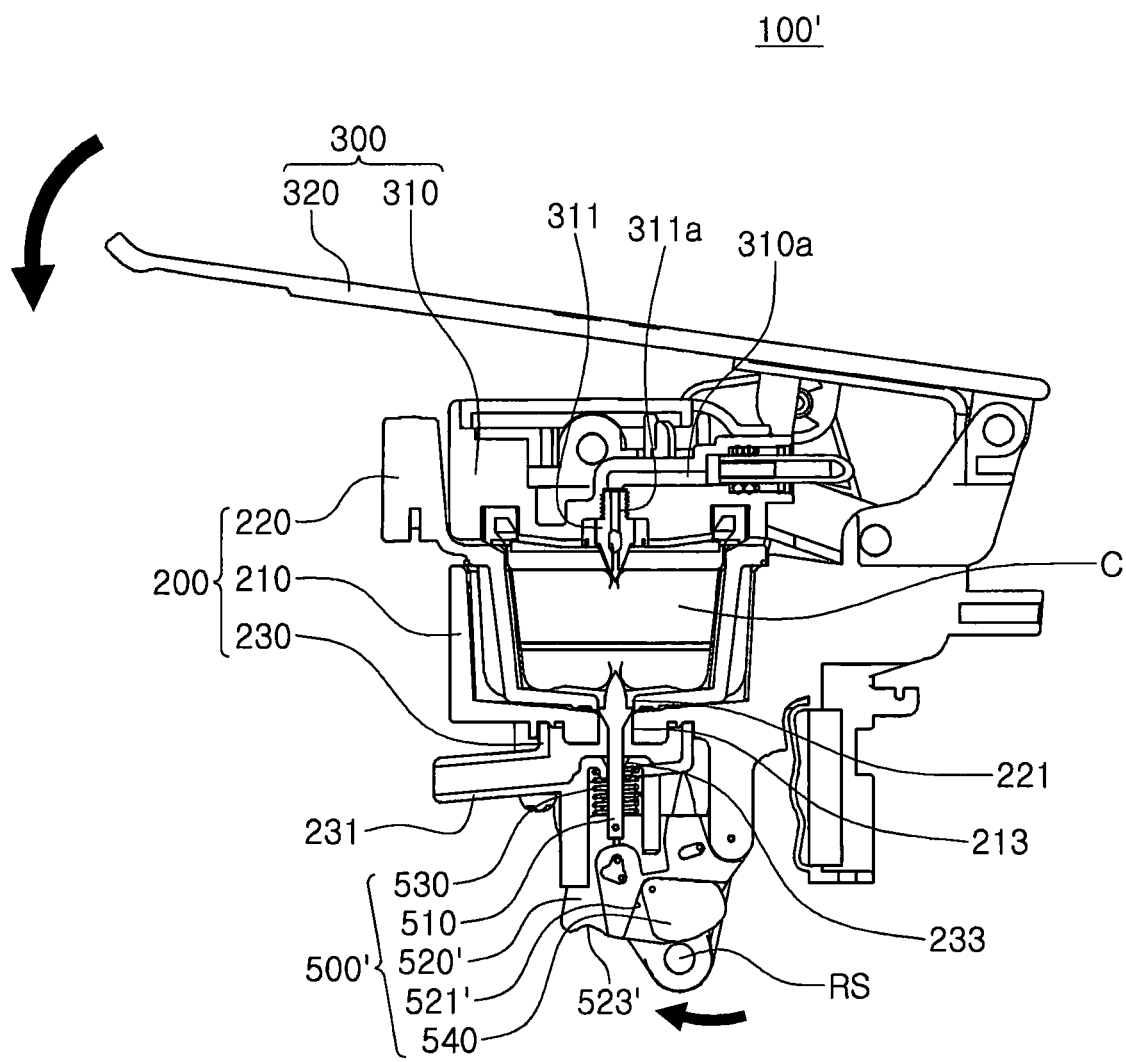

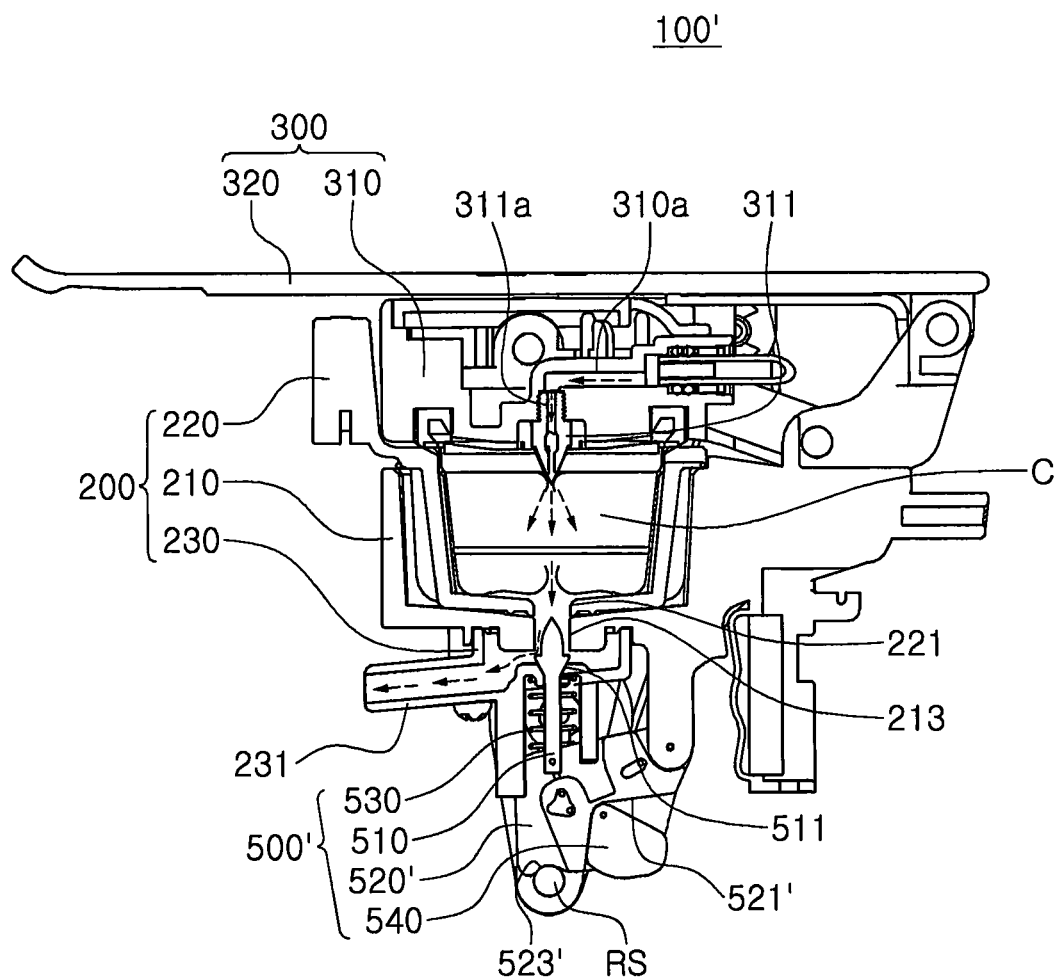
[Figure 11]

BEVERAGE EXTRACTING DEVICE AND WATER PURIFIER INCLUDING SAME

PRIORITY

This application is a National Phase Entry of PCT International Application No. PCT/KR2015/009076, which was filed on Aug. 28, 2015, and claims priority to Korean Patent Application No. 10-2014-0121398, which was filed on Sep. 12, 2014, the contents of each of which are incorporated herein by reference.

TECHNICAL FIELD

The present disclosure relates to a beverage extracting device and a water purifier including the same.

BACKGROUND ART

A beverage extracting device is a device for extracting a beverage such as coffee, green tea, or the like to provide the beverage to a user.

To this end, a beverage extracting device may use a beverage capsule in which beverage powder such as coffee, green tea, or the like is stored.

In a beverage extracting device using a beverage capsule, hot water at a predetermined pressure is supplied from a hot water source to a beverage capsule, and thus, the hot water at a predetermined pressure is mixed with the beverage powder.

In addition, as described above, when the hot water at a predetermined pressure is mixed with the beverage powder, a beverage is produced. In other words, a beverage can be extracted from a beverage capsule.

As described above, a beverage is extracted from a beverage extracting device to be provided to a user.

Generally, in a beverage extracting device, a beverage capsule is perforated using a separate punching member, or the like. In this case, after a beverage capsule is perforated by a punching member, the beverage capsule remains located inside the beverage extracting device. Therefore, a problem, in which it is difficult to discharge a beverage extracted from the beverage capsule through a perforated hole, may occur.

Therefore, a problem in which beverage powder is highly compressed inside a beverage capsule and a beverage extraction function is significantly reduced may also occur.

DISCLOSURE

Technical Problem

An aspect of the present disclosure may provide a beverage extracting device allowing a beverage, extracted from a beverage capsule, to be easily discharged from the beverage capsule, and a water purifier including the same.

An aspect of the present disclosure may provide a beverage extracting device having an improved beverage extraction function and a water purifier including the same.

Technical Solution

According to an aspect of the present disclosure, a beverage extracting device includes: an extracting part including an installing space in which a beverage capsule is installed; an opening and closing part connected to the extracting part, for opening or sealing the installing space; a link part connected to at least one between the extracting part and the opening and closing part; and a perforating part moving reciprocally so as to perforate the beverage capsule due to movement of the link part.

The opening and closing part of the beverage extracting device according to an aspect of the present disclosure may be connected to the extracting part to be rotated.

The link part of the beverage extracting device according to an aspect of the present disclosure may be coupled to the opening and closing part to be rotated.

The perforating part of the beverage extracting device according to an aspect of the present disclosure may move reciprocally between an interior and an exterior of the installing space.

The extracting part of the beverage extracting device according to an aspect of the present disclosure may include a holder in which the installing space is formed, a body for accommodating the holder, and a discharging member installed below the body.

The bottom surfaces of the holder and the body of the beverage extracting device according to an aspect of the present disclosure may be provided with discharge holes penetrating therethrough.

The discharging member of the beverage extracting device according to an aspect of the present disclosure may be provided with an insertion hole into which the perforating part is inserted, and may be provided with a discharge port through which a beverage extracted from the beverage capsule is discharged externally.

The insertion hole of the beverage extracting device according to an aspect of the present disclosure may be formed to have a diameter narrower toward a lower portion, and the perforating part may be provided with a stopper in a shape corresponding to a shape of the insertion hole.

The opening and closing part of the beverage extracting device according to an aspect of the present disclosure may include a cover for opening or sealing the installing space and a lever member connected to the cover to be rotated.

Due to the link part of the beverage extracting device according to an aspect of the present disclosure, rotational force of the lever member may be transmitted to the cover.

The link part of the beverage extracting device according to an aspect of the present disclosure may include: a first link member coupled to the lever member to be rotated; a second link member coupled to the first link member to be rotated; and a third link member coupled to the second link member to be rotated.

The link part of the beverage extracting device according to an aspect of the present disclosure may include: a first link member having one side connected to the lever member to be rotated; a second link member having one side connected to the body to be rotated; and a third link member having one side connected to the cover to be rotated, wherein the other side of the second link member may be connected to the other side of the first link member and the other side of the third link member to be rotated.

The beverage extracting device according to an aspect of the present disclosure may further include a rotating shaft connected to the other side of the second link member.

The perforating part of the beverage extracting device according to an aspect of the present disclosure may include: a guide link rotationally reciprocating due to rotation of the rotating shaft; and a first punch linearly reciprocating due to rotationally reciprocating motion of the guide link.

One side of the guide link of the beverage extracting device according to an aspect of the present disclosure may be connected to the extracting part to be rotated, and the other side of the guide link may be connected to the first punch to be rotated.

A portion of a bottom of the guide link of the beverage extracting device according to an aspect of the present disclosure, corresponding to one side of the guide link, may be provided with a first stopper protrusion formed therein, and a portion thereof, corresponding to the other side of the guide link, may be provided with a second stopper protrusion formed therein.

In a portion of a bottom of the guide link of the beverage extracting device according to an aspect of the present disclosure, corresponding to one side of the guide link, an insertion groove may be formed therein, and a rotating link member may be inserted into the insertion groove to be connected to the guide link to be rotated.

A portion of the rotating link member of the beverage extracting device according to an aspect of the present disclosure may protrude outwardly of the guide link by self weight.

A bottom of the guide link of the beverage extracting device according to an aspect of the present disclosure may be formed to have a curved surface, and the rotating shaft may move slidingly with respect to the bottom of the guide link.

The first punch of the beverage extracting device according to an aspect of the present disclosure may linearly reciprocate between an interior and an exterior of the installing space.

According to another aspect of the present disclosure, a water purifier includes: a beverage extracting device; a housing for accommodating the beverage extracting device; and a beverage extraction port provided in the housing to discharge a beverage extracted from the beverage extracting device.

The beverage extracting device according to another aspect of the present disclosure may further include: a cold-purified water extraction port provided in the housing to discharge cold-purified water; and a hot water discharge port provided in the housing to discharge hot water.

Advantageous Effects

According to an exemplary embodiment in the present disclosure, a beverage extracting device and a water purifier including the same may easily discharge a beverage, extracted from a beverage capsule, from the beverage capsule.

In addition, a beverage extraction function may be improved.

DESCRIPTION OF DRAWINGS

FIG. 1 is a perspective view of a water purifier according to an exemplary embodiment in the present disclosure.

FIG. 2 is an exploded perspective view of a beverage extracting device according to an exemplary embodiment in the present disclosure.

FIG. 3 is a perspective view illustrating a state in which an opening and closing part of a beverage extracting device according to an exemplary embodiment in the present disclosure is open.

FIG. 4 is a perspective view illustrating a state in which an opening and closing part of a beverage extracting device according to an exemplary embodiment in the present disclosure is closing.

FIG. 5 is a perspective view illustrating a state in which an opening and closing part of a beverage extracting device according to an exemplary embodiment in the present disclosure is closed.

FIG. 6 is a cross-sectional view illustrating a state in which the opening and closing part in the beverage extracting device according to an exemplary embodiment in the present disclosure is open.

FIG. 7 is a cross-sectional view illustrating a state in which the opening and closing part in the beverage extracting device according to an exemplary embodiment in the present disclosure is closing.

FIG. 8 is a cross-sectional view illustrating a state in which the opening and closing part in the beverage extracting device according to an exemplary embodiment in the present disclosure is closed.

FIG. 9 is a cross-sectional view illustrating a state in which the opening and closing part in a beverage extracting device according to another exemplary embodiment in the present disclosure is open.

FIG. 10 is a cross-sectional view illustrating a state in which the opening and closing part in the beverage extracting device according to another exemplary embodiment in the present disclosure is closing.

FIG. 11 is a cross-sectional view illustrating a state in which the opening and closing part in the beverage extracting device according to another exemplary embodiment in the present disclosure is closed.

BEST MODE FOR INVENTION

Hereinafter, specific embodiments of the present disclosure will be described in detail with reference to the drawings. Those skilled in the art of the present disclosure will be able to easily suggest other regressive disclosures or other embodiments included within the scope of the present disclosure, through adding, changing or deleting other elements within the scope of the same idea, but those also are included within the scope of the present disclosure.

In addition, throughout the specification, a configuration is referred to as being 'connected' to another configuration, including not only when the configurations are 'directly connected' but also when they are 'indirectly connected' to each other. Also, some components are 'included', means that it would be possible not to exclude other components but to further include other components not otherwise specifically stated.

The same components have the same functions in the scope of the same idea illustrated in the drawings of each embodiment will be described using the same reference numerals.

FIG. 1 is a perspective view of a water purifier according to an exemplary embodiment in the present disclosure.

With reference to FIG. 1, a water purifier according to an exemplary embodiment in the present disclosure may include a housing 10, a beverage extracting device 100 inserted into and fixed to the housing 10, and a beverage extraction port 20 provided in the housing 10 to be connected to the beverage extracting device 100.

In addition, the water purifier may further include a cold-purified water extraction port 30 from which cold-purified water is discharged and a hot water extraction port 40 from which hot water is discharged.

The housing 10 may form an exterior of the water purifier according to an exemplary embodiment in the present disclosure, and the cold-purified water extraction port 30 and the hot water extraction port 40 may be provided in front of the water purifier.

Moreover, in addition to the cold-purified water extraction port 30 and the hot water extraction port 40, the beverage extraction port 20 is provided therein. Through the beverage extraction port 20, a beverage extracted from the beverage extracting device 100 may be discharged externally.

Thus, a user may drink cold water, purified water, or hot water according to preference, or may drink a beverage extracted from the beverage extracting device.

Hereinafter, with reference to FIGS. 2 to 11, the beverage extracting device 100 will be described.

FIG. 2 is an exploded perspective view of a beverage extracting device according to an exemplary embodiment in the present disclosure, FIG. 3 is a perspective view illustrating a state in which an opening and closing part of a beverage extracting device according to an exemplary embodiment in the present disclosure is open, FIG. 4 is a perspective view illustrating a state in which an opening and closing part of a beverage extracting device according to an exemplary embodiment in the present disclosure is closing, and FIG. 5 is a perspective view illustrating a state in which an opening and closing part of a beverage extracting device according to an exemplary embodiment in the present disclosure is closed.

With reference to FIGS. 2 to 5, a beverage extracting device 100 according to an exemplary embodiment in the present disclosure may include an extracting part 200, an opening and closing part 300, a link part 400, and a perforating part 500.

First, the beverage extracting device 100 according to an exemplary embodiment in the present disclosure will be schematically described.

An installing space MS may be provided in the extracting part 200, and a beverage capsule C may be installed in the installing space MS. The opening and closing part 300 is connected to the extracting part 200 so as to open or seal the installing space MS.

For example, the opening and closing part 300 may be connected to the extracting part 200 to be rotated. When the opening and closing part 300 is closed, the installing space MS may be sealed. When the opening and closing part 300 is open, the installing space MS may be open.

The beverage capsule C is installed in the installing space MS, and high-pressure hot water may be provided for the beverage capsule C through the opening and closing part 300, while the installing space C is sealed.

When the opening and closing part 300 is closed, the beverage capsule C is perforated by the perforating part 500, and thus, a beverage may be extracted from the beverage capsule C.

To perforate the beverage capsule C, the perforating part 500 may include a first punch 510.

The beverage extracted from the beverage capsule C may be discharged externally through the extracting part 200.

In this case, even when high pressure is applied to the installing space MS, not to open the opening and closing part 300, but to maintain a state in which the installing space MS is sealed, the link part 400 may be provided.

Hereinafter, with reference to FIGS. 2 to 5, each configuration will be described in detail.

The extracting part 200 may include a body 210, a holder 220, and a discharging member 230.

A seat groove 211 allowing the holder 220 to be seated thereon may be provided in the body 210, and the holder 220 may be inserted into the seat groove 211 to be seated thereon.

The installing space MS may be formed in the holder 220, and the beverage capsule C may be installed in the installing space MS. To this end, an upper part of the installing space MS may be open and the installing space MS may have a shape corresponding to that of the beverage capsule C.

Since the beverage capsule C is inserted into the installing space MS from the open upper part of the installing space MS, the beverage capsule may be installed in the installing space MS.

Discharge holes 213 and 221 may penetrate through a bottom surface of the seat groove 211 and a bottom surface of the holder 220 to be formed in positions corresponding thereto, respectively, and thus, a beverage extracted from the beverage capsule C may be discharged therethrough.

The discharging member 230 may be installed below the body 210, and a discharge port 231 from which the beverage is discharged may be provided therein.

The beverage is provided for the discharging member 230 through the discharge holes 213 and 221 formed in the bottom surface of the seat groove 211 and the bottom surface of the holder 220, respectively, and the beverage may be discharged externally through the discharge port 231.

In addition, an insertion hole 233 may be penetrated through and formed in the discharging member 230, and the first punch 510 may be disposed in the insertion hole 233.

Here, a diameter of the insertion hole 233 is formed to be narrower downwardly, and the first punch 510 is provided with a stopper 511 having a shape corresponding to a shape of the insertion hole 233. Thus, the insertion hole 233 may be sealed by the first punch 510.

The first punch 510 is disposed to be reciprocating moved, and the first punch 510 moves inside of the installing space MS through the discharge holes 213 and 221 to perforate the beverage capsule C. In addition, after the first punch 510 perforates the beverage capsule C, the first punch moves outside of the installing space MS, and thus, the stopper 511 allows the insertion hole 233 to be sealed thereby.

Thus, the beverage provided for the discharging member 230 may not be discharged externally through the insertion hole 233, and may be discharged externally through the discharge port 231.

A reciprocating motion of the first punch 510 will be described later with respect to FIGS. 6 to 8.

The opening and closing part 300 may be connected to the extracting part 200 to open or seal the installing space MS. To this end, the opening and closing part 300 may include a cover 310 and a lever member 320.

The cover 310 may be coupled to the lever member 320 to be rotated depending on a location of the lever member 320 so as to open and close the open upper part of the installing space MS.

Thus, as illustrated in FIG. 5, the installing space MS may be sealed, or as illustrated in FIGS. 3 and 4, the installing space MS may be open.

To allow the cover 310 to be coupled to the lever member 320 and to be rotated, the cover 310 may be connected to the lever member 320.

In addition, each of the cover 310 and the lever member 320 may be connected to the body 210, as illustrated in FIGS. 3 to 5.

For example, each of the cover 310 and the lever member 320 may be connected to the body 210 by a connecting pin P to be rotated. Thus, the cover 310 and the lever member 320, as illustrated in FIGS. 3 to 5, may be rotated based on the connecting pin P.

When a user applies force upwardly to the lever member 320, to open an upper part of the installing space MS, the cover 310 may be rotated with the lever member 320.

In addition, in the state described above, when a user applies a force downwardly the lever member 320, to allow the upper part of the installing space MS to be closed by the cover 310, the cover 310 may be rotated with the lever member 320. Thus, while the beverage capsule C is installed in the installing space MS, the installing space MS may be sealed.

Meanwhile, when the installing space MS is sealed, to perforate an upper part of the beverage capsule C installed in the installing space MS, a second punch 311 may be provided in the cover 310.

As a tip of the second punch 311 is formed to be sharpened, the beverage capsule C may be perforated thereby. As hot water supply flow paths 310a and 311a communicating each other are provided in the cover 310 and the second punch 311, high-pressure hot water may be provided for the beverage capsule C through the hot water supply flow paths 310a and 311a.

While the installing space MS is sealed, even when high pressure is applied to the installing space MS, the link part 400 may serve to allow the opening and closing part 300 not to be open.

To this end, the link part 400 may include a first link member 410, a second link member 420, and a third link member 430.

One side of the first link member 410 may be connected to the lever member 320 to be rotated, one side of the second link member 420 may be connected to the body 210 to be rotated, and one side of the third link member 430 may be connected to the cover 310 to be rotated.

In addition, the other side of the second link member 420 may be connected to the other side of the first link member 410 and the other side of the third link member 430 to be rotated.

Thus, the first link member 410, the second link member 420, and the third link member 430 may be coupled to the opening and closing part 300 to be rotated.

For example, due to an operation of the lever member 320, the other side of the first link member 410 is rotated based on one side of the first link member 410, and thus, the other side of the second link member 420 is rotated based on one side of the second link member 420. Thus, the other side of the third link member 430 may be rotated based on one side of the third link member 430.

Meanwhile, as illustrated in FIG. 5, when the opening and closing part 300 allows the installing space MS to be sealed, a second center virtual line L2 extended from one side of the second link member 420 to the other side thereof may be located between a first center virtual line L1 extended from one side of the first link member 410 to the other side thereof and a third center virtual line L3 extended from one side of the third link member 430 to the other side thereof.

Thus, a direction of rotation of the second link member 420 due to movement of the first link member 410 when the lever member 320 is lifted up, may be different from a direction of rotation of the second link member 420 due to movement of the third link member 430 when the cover 310 is pushed up by applying high pressure to the installing space MS.

In addition, the third center virtual line L3 may be positioned closer to the discharge port 231 of the extracting part 200 than the first center virtual line L1.

Thus, as illustrated in FIGS. 4 and 5, while the installing space MS is sealed by the cover 310, when the lever member 320 is lifted up, a direction of rotation of the second link member 420 due to movement of the first link member 410 may be a counterclockwise direction based on FIGS. 4 and 5. Thus, when the lever member 320 is lifted up, the cover 310 may be open.

Alternatively, when the lever member 320 is lowered to seal the installing space MS, a direction of rotation of the second link member 420 may be a clockwise direction based on FIGS. 4 and 5. Thus, when the lever member 320 is lowered, the cover 310 may be closed.

In addition, as illustrated in FIG. 5, while the installing space MS is sealed by the cover 310, when high pressure is applied to the installing space MS, a force is applied to a direction in which the cover 310 is lifted up. In this case, a direction of rotation of the second link member 420 due to movement of the third link member 430 may be a clockwise direction based on FIG. 5.

Thus, the cover 310 may further close the upper part of installing space MS due to the third link member 430.

In addition, a sawtooth-shaped groove 431 may be formed in the third link member 430, and a sawtooth-shaped groove 215 may be formed in the body 210. Thus, when the installing space MS is sealed by the cover 310, the third link member 430 may be engaged with the body 210.

When a force is applied in a direction in which the cover 310 is lifted by high pressure applied to the installing space MS, while the second link member 420 rotates in a clockwise direction, the third link member 430 is pulled thereby. Thus, the third link member 430 is more closely attached to the body 210. As a result, even when high pressure is applied to the installing space MS, the cover 310 may not be open.

Meanwhile, the first link member 410, the second link member 420, and the third link member 430 may be provided as pairs to be symmetrical to each other on both sides of the extracting part 200 and the opening and closing part 300.

In the other side of the second link member 420, a rotating shaft RS for connecting two second link members 420 to each other may be provided therein.

Hereinafter, with reference to FIGS. 6 to 8, due to rotation of the opening and closing part 300, an operation in which the perforating part 500 moves reciprocally will be described.

FIG. 6 is a cross-sectional view illustrating a state in which the opening and closing part is open in a beverage extracting device according to an exemplary embodiment in the present disclosure, FIG. 7 is a cross-sectional view illustrating a state in which the opening and closing part is closing in a beverage extracting device according to an exemplary embodiment in the present disclosure, and FIG. 8 is a cross-sectional view illustrating a state in which the opening and closing part is closed in a beverage extracting device according to an exemplary embodiment in the present disclosure.

With reference to FIGS. 6 to 8, the perforating part 500 is moved reciprocally due to rotation of the opening and closing part 300.

To this end, the perforating part 500 may include the first punch 510 and a guide link 520.

First, with reference to FIG. 6, one side of the first punch 510 may be inserted inside of the discharging member 230 through the insertion hole 233 of the discharging member 230.

As described previously, a diameter of the insertion hole 233 is formed to be narrower downwards, and the stopper 511 having a shape corresponding to a shape of the insertion hole 233 is provided in one side of the first punch 510. Thus, the first punch 510 is prevented from falling out from the insertion hole 233.

One side of the guide link 520 may be connected to the extracting part 200 to be rotated, and the other side of the guide link 520 may be connected to the other side of the first punch 510 to be rotated.

By self weight of the guide link 520, the other side of the guide link 520 may be rotated based on one side of the guide link 520. However, since the other side of the guide link 520 is connected to the first punch 510, even when the other side of the guide link 520 is rotated by self weight, the first punch 510 may be stopped while being in close contact with the insertion hole 233, due to the stopper 511 of the first punch 510.

Thus, the guide link 520 may not be further rotated and may be supported in a stopped state.

Meanwhile, a bottom of the guide link 520 may be formed to have a curved surface having a predetermined radius of curvature.

When the second link member 420 is rotated in a clockwise direction or in a counter-clockwise direction due to an operation of the opening and closing part 300, the rotating shaft RS connected to the second link member 420 may be sliding-moved with respect to the bottom of the guide link 520.

In addition, a first stopper protrusion 521 may be formed in a portion of the bottom the guide link 520, corresponding to one side of the guide link 520, and a second stopper protrusion 523 may be formed in a portion of the bottom of the guide link 520, corresponding to the other side of the guide link 520.

With reference to FIG. 7, when the opening and closing part 300 is closed, the second link member 420 rotates in a clockwise direction, and thus, the rotating shaft RS connected to the second link member 420 may rotate in a clockwise direction.

In this case, the rotating shaft RS is caught by the first stopper protrusion 521. Due to a force in which the rotating shaft RS pushes the first stopper protrusion 521, the other side of the guide link 520 may be rotated based on one side of the guide link 520.

Since the other side of the guide link 520 rotates, the first punch 510 connected to the other side of the guide link 520 is lifted upwards. In this case, the first punch 510 is inserted inside of the installing space MS.

Thus, the beverage capsule C installed inside of the installing space MS may be perforated.

Next, as illustrated in FIG. 8, when the opening and closing part 300 is closed to seal the installing space MS, the rotating shaft RS moves slidingly along a bottom of the guide link 520, and thus, the rotating shaft is seated on the second stopper protrusion 523.

In this case, the guide link 520 rotates in a counter-clockwise direction, and thus, the first punch 510 connected to the other side of the guide link 520 may be moved downwards due to rotation of the guide link 520 in a counterclockwise direction.

To this end, an elastic member 530 is provided in the perforating part 500.

One side of the elastic member 530 may be fixed to the extracting part 200, and the other side of the elastic member 530 may be fixed to the guide link 520.

Thus, as illustrated in FIG. 8, while the rotating shaft RS moves slidingly along the bottom of the guide link 520, the other side of the guide link 520 is rotated in a counter-clockwise direction due to an elastic force of the elastic member 530, and thus, the first punch 510 is in close contact with the insertion hole 233 while moving downwardly.

In other words, due to an operation of the opening and closing part 300, the guide link 520 may rotationally reciprocating move, and the first punch 510 may linearly reciprocating move.

In the beverage extracting device 100 according to an exemplary embodiment in the present disclosure, after the first punch 510 perforates the beverage capsule C, the first punch moves downwards. Thus, enough space for discharging a beverage extracted from the beverage capsule C through a perforated portion of the beverage capsule may be secured.

In the case in which the space for discharging a beverage extracted from the beverage capsule C is not secured, beverage powders are highly compressed inside of the beverage capsule C, thereby significantly lowering an extraction function of the beverage.

However, in the beverage extracting device 100 according to an exemplary embodiment in the present disclosure, since enough space for discharging a beverage extracted from the beverage capsule C through the perforated portion of the beverage capsule is secured, an extraction function of the beverage may be improved.

FIG. 9 is a cross-sectional view illustrating a state in which the opening and closing part is open in a beverage extracting device according to another exemplary embodiment in the present disclosure, FIG. 10 is a cross-sectional view illustrating a state in which the opening and closing part is closing in a beverage extracting device according to another exemplary embodiment in the present disclosure, and FIG. 11 is a cross-sectional view illustrating a state in which the opening and closing part is closed in a beverage extracting device according to another exemplary embodiment in the present disclosure.

A beverage extracting device 100' according to another exemplary embodiment in the present disclosure is the same as the beverage extracting device 100 according to an exemplary embodiment in the present disclosure except a guide link 520', descriptions will be omitted, other than with regard to the guide link 520'.

In another exemplary embodiment in the present disclosure, a rotating link member 540 may be further included in the guide link 520'.

To this end, an insertion groove 521' may be formed in a portion of a bottom of the guide link 520' corresponding to one side of the guide link 520', and the rotating link member 540 is inserted into the insertion groove 521'. Thus, one side of the rotating link member may be connected to the guide link 520' to be rotated.

The insertion groove 521' may have a shape corresponding to a shape of the rotating link member 540.

In this case, the other side of the rotating link member 540 is rotated based on one side of the rotating link member 540 by self weight, and thus, a portion of the other side of the rotating link member 540 may protrude outwardly of the guide link 520'.

Thus, when the opening and closing part 300 is closed, the rotating shaft RS pushes the other side of the rotating link member 540 protruding outwardly of the guide link 520', and thus, the guide link 540 is rotated. Thus, due to rotation of the guide link 520, the first punch 510 is inserted inside of the installing space MS.

Until the installing space MS is sealed by closing the opening and closing part 300, the rotating shaft RS moves along a bottom of the guide link 520' to be seated on a stopper protrusion 523' of the guide link 520'.

When the opening and closing part 300, which is closed, is open, the rotating shaft RS moves along the bottom of the guide link 520' in a direction opposite to a direction in which the rotating shaft RS moves when the opening and closing part 300 is closed.

In this case, the rotating shaft RS pushes the rotating link member 540 protruding outwardly of the guide link 520', and thus, the other side of the rotating link member 540 is rotated based on one side of the rotating link member 540 to be inserted inside of the insertion groove 521'.

Due to a structure described above, when the opening and closing part 300 is open, the rotating link member 540 allows movement of the rotating shaft RS not to be limited. Thus, the opening and closing part 300 may open with a small force.

Through the exemplary embodiments described above, a beverage extracting device according to an exemplary embodiment in the present disclosure and a water purifier including the same may allow a beverage extracted from a beverage capsule to be easily discharged from the beverage capsule.

In addition, a beverage extraction function may be improved.

While the present disclosure has been particularly shown and described with reference to exemplary embodiments thereof, but is not limited thereto. It is apparent to those skilled in the art that various changes and modifications thereof may be made within the spirit and scope of the present disclosure, and therefore to be understood that such changes and modifications belong to the scope of the appended claims.

The invention claimed is:

1. A beverage extracting device, comprising:
 an extracting part including an installing space in which a beverage capsule is installed;
 an opening and closing part connected to the extracting part, for opening or sealing the installing space;
 a link part connected to at least one between the extracting part and the opening and closing part; and
 a perforating part moving reciprocally so as to perforate the beverage capsule due to movement of the opening and closing part,
 wherein the extracting part is provided with an discharge hole into which the perforating part is inserted, and is provided with a discharge port communicating with the discharge hole and through which a beverage extracted from the beverage capsule is discharged externally via the discharge hole,
 wherein the perforating part includes:
 a first punch reciprocating in the discharge hole,
 wherein when the opening and closing part, which is an open state, moves downward to a first position, the first punch perforates the beverage capsule,
 wherein when the opening and closing part, which is in the first position, further moves downward until the installing space is sealed, the first punch retreats from the beverage capsule.

2. The beverage extracting device of claim 1, wherein the opening and closing part is connected to the extracting part to be rotated, and the link part is coupled to the opening and closing part to be rotated.

3. The beverage extracting device of claim 1, wherein the perforating part moves reciprocally between an interior and an exterior of the installing space.

4. The beverage extracting device of claim 1, wherein the extracting part includes a holder in which the installing space is formed, a body for accommodating the holder, and a discharging member installed below the body.

5. The beverage extracting device of claim 4, wherein bottom surfaces of the holder and the body are provided with the discharge hole penetrating therethrough.

6. The beverage extracting device of claim 5, wherein the discharging member is provided with an insertion hole, and is provided with the discharge port.

7. The beverage extracting device of claim 6, wherein the insertion hole is formed to have a diameter narrower toward a lower portion, and the perforating part is provided with a stopper in a shape corresponding to a shape of the insertion hole.

8. The beverage extracting device of claim 1, wherein the opening and closing part includes a cover for opening or sealing the installing space and a lever member connected to the cover to be rotated.

9. The beverage extracting device of claim 8, wherein, due to the link part, rotational force of the lever member is transmitted to the cover.

10. The beverage extracting device of claim 8, wherein the link part includes:
 a first link member coupled to the lever member to be rotated;
 a second link member coupled to the first link member to be rotated; and
 a third link member coupled to the second link member to be rotated.

11. The beverage extracting device of claim 8, wherein the link part includes:
 a first link member having one side connected to the lever member to be rotated;
 a second link member having one side connected to the body to be rotated; and
 a third link member having one side connected to the cover to be rotated,
 wherein the other side of the second link member is connected to the other side of the first link member and the other side of the third link member to be rotated.

12. The beverage extracting device of claim 11, further comprising a rotating shaft connected to the other side of the second link member.

13. The beverage extracting device of claim 12, wherein the perforating part includes:
 a guide link rotationally reciprocating due to rotation of the rotating shaft,
 wherein the first punch linearly reciprocating due to rotationally reciprocating motion of the guide link.

14. The beverage extracting device of claim 13, wherein one side of the guide link is connected to the extracting part to be rotated, and the other side of the guide link is connected to the first punch to be rotated.

15. The beverage extracting device of claim 14, wherein a portion of a bottom of the guide link, corresponding to one side of the guide link, is provided with a first stopper protrusion formed therein, and a portion thereof, corresponding to the other side of the guide link, is provided with a second stopper protrusion formed therein.

16. The beverage extracting device of claim 14, wherein, in a portion of a bottom of the guide link, corresponding to one side of the guide link, an insertion groove is formed therein, and a rotating link member is inserted into the insertion groove to be connected to the guide link to be rotated.

17. The beverage extracting device of claim 16, wherein a portion of the rotating link member protrudes outwardly of the guide link by self weight.

18. The beverage extracting device of claim 13, wherein a bottom of the guide link is formed to have a curved surface, and the rotating shaft moves slidingly with respect to the bottom of the guide link.

19. The beverage extracting device of claim 13, wherein the first punch linearly reciprocates between an interior and an exterior of the installing space.

20. A water purifier, comprising:
- the beverage extracting device according to claim 1;
- a housing for accommodating the beverage extracting device;
- a beverage extraction port provided in the housing to discharge a beverage extracted from the beverage extracting device;
- a cold-purified water extraction port provided in the housing to discharge cold-purified water; and
- a hot water discharge port provided in the housing to discharge hot water.

* * * * *